(No Model.)
7 Sheets—Sheet 1.

J. D. MILLS.
SULKY CORN PLANTER.

No. 302,857.
Patented July 29, 1884.

WITNESSES
Chas. R. Burr
Fred F. Church

INVENTOR
John Dix Mills
by Church & Church
His Attorneys (No Model.)
7 Sheets—Sheet 2.

J. D. MILLS.
SULKY CORN PLANTER.

No. 302,857. Patented July 29, 1884.

WITNESSES
Chas. R. Burr
Fred F. Church

INVENTOR
John Dix Mills
by Church & Church
His Attorneys (No Model.)   J. D. MILLS.   7 Sheets—Sheet 3.
SULKY CORN PLANTER.

No. 302,857.   Patented July 29, 1884.

Fig. 3.

WITNESSES
Chas. R. Burr
Fred F. Church

INVENTOR
John Dix Mills
by Church & Church
his Attorneys

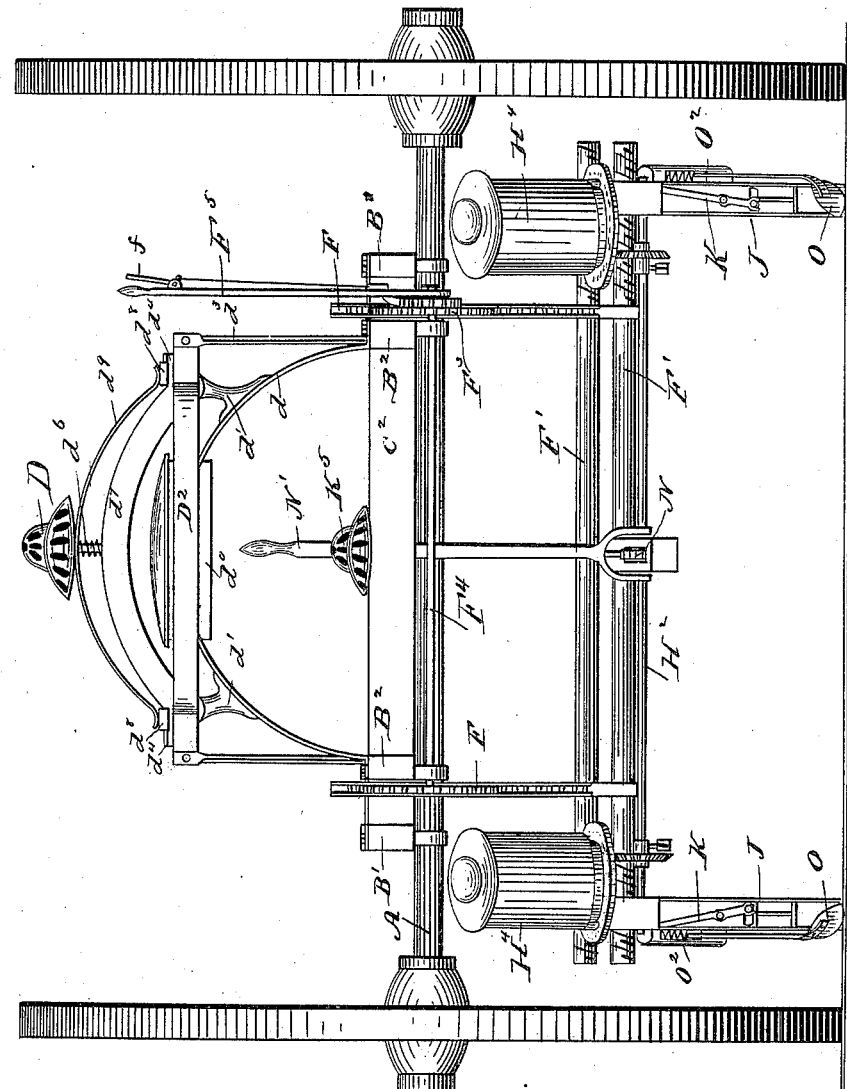

(No Model.) 7 Sheets—Sheet 5.
J. D. MILLS.
SULKY CORN PLANTER.
No. 302,857. Patented July 29, 1884.
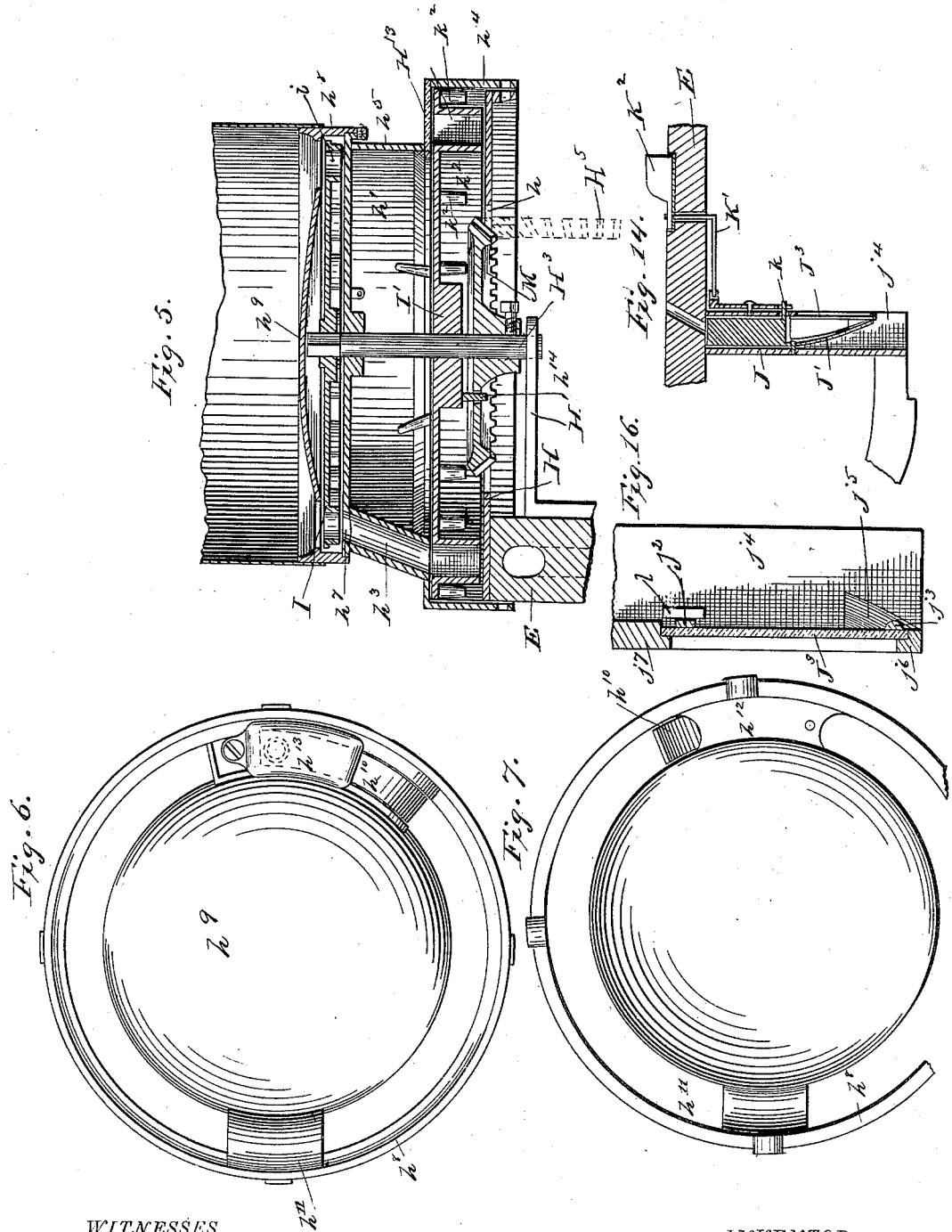

(No Model.)  7 Sheets—Sheet 6.
J. D. MILLS.
SULKY CORN PLANTER.
No. 302,857. Patented July 29, 1884.
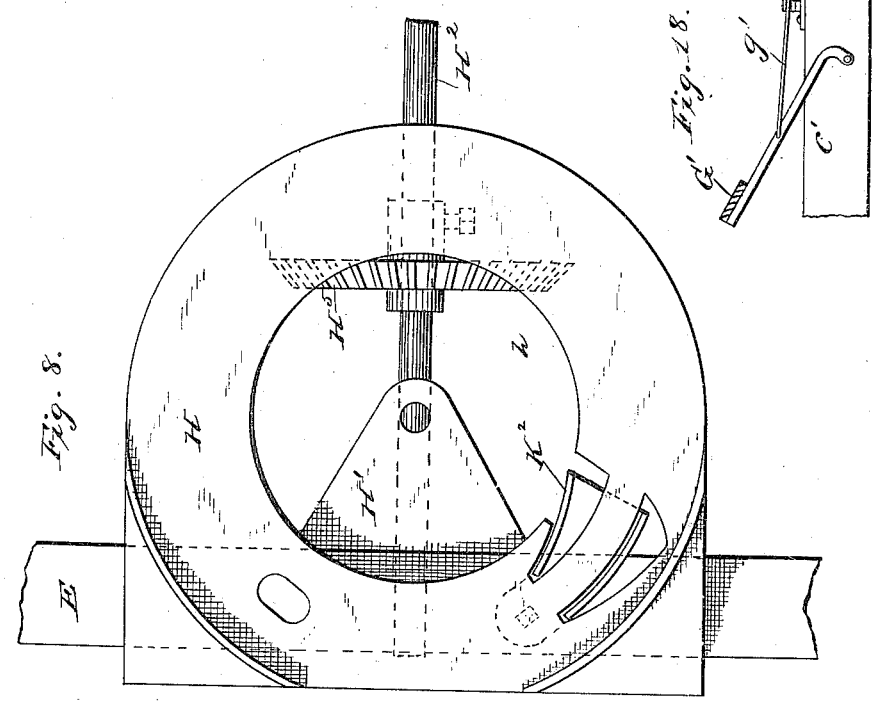
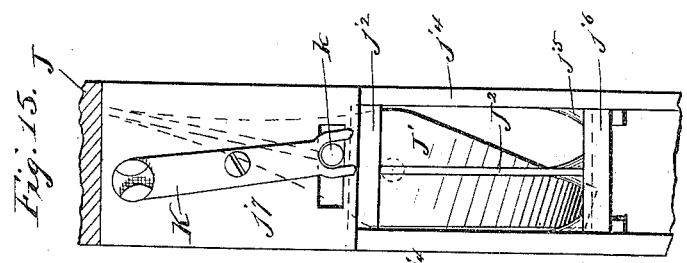
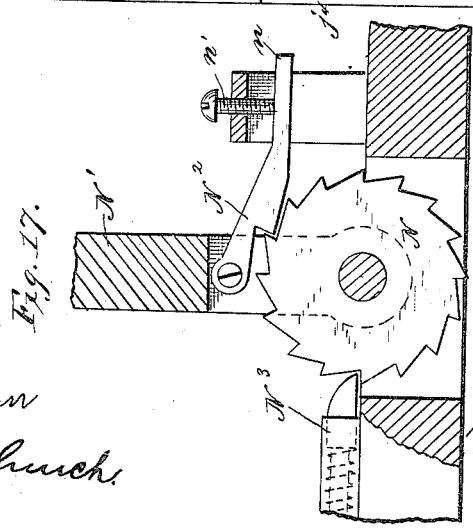
WITNESSES
Chas. R. Burr
Fred F. Church
INVENTOR
John Dix Mills
By Church & Church
His Attorneys (No Model.)
J. D. MILLS.
SULKY CORN PLANTER.
No. 302,857. Patented July 29, 1884.
7 Sheets—Sheet 7.
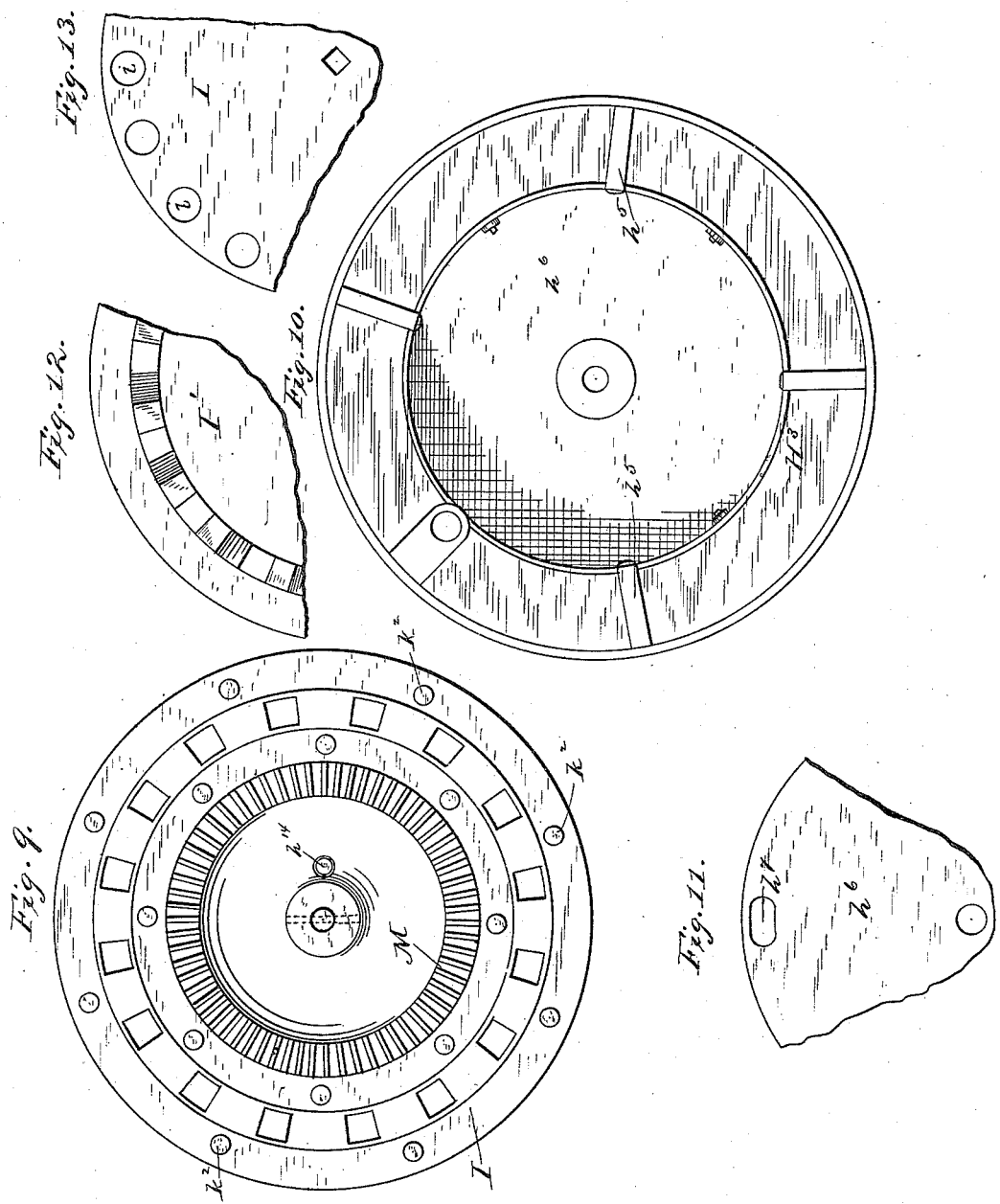
WITNESSES
Chas. R. Burr
Fred F. Church
INVENTOR
John Dix Mills
By Church & Church
His Attorneys

UNITED STATES PATENT OFFICE.

JOHN DIX MILLS, OF CINCINNATI, OHIO.

SULKY CORN-PLANTER.

SPECIFICATION forming part of Letters Patent No. 302,857, dated July 29, 1884.

Application filed January 3, 1884. (No model.)

*To all whom it may concern:*

Be it known that I, JOHN DIX MILLS, of the city of Cincinnati, in the county of Hamilton and State of Ohio, have invented certain new and useful Improvements in Sulky Corn-Planters; and I do hereby declare the following to be a full, clear, and exact description of the same, reference being had to the accompanying drawings, forming a part of this specification, and to the figures and letters of reference marked thereon.

My present invention relates to that class of corn-planters known to the trade as "sulky-planters," by reason of the fact that the machine is mounted upon wheels, which serve to support and guide the working parts, thus facilitating the movements of the machine, and at the same time reducing the labor entailed upon both the driver and team.

The improvements to be hereinafter more fully described, and specified in the claims, pertain generally to the manner and means of attaching, supporting, and manipulating the runners and the frame to which they are connected; to the structure and arrangement of the mechanism constituting the feeding devices, as well as the means for mounting and operating the same, together with certain minor but important improvements in details and combinations, all of which will first be described, and then pointed out in the claims.

Figure 1:
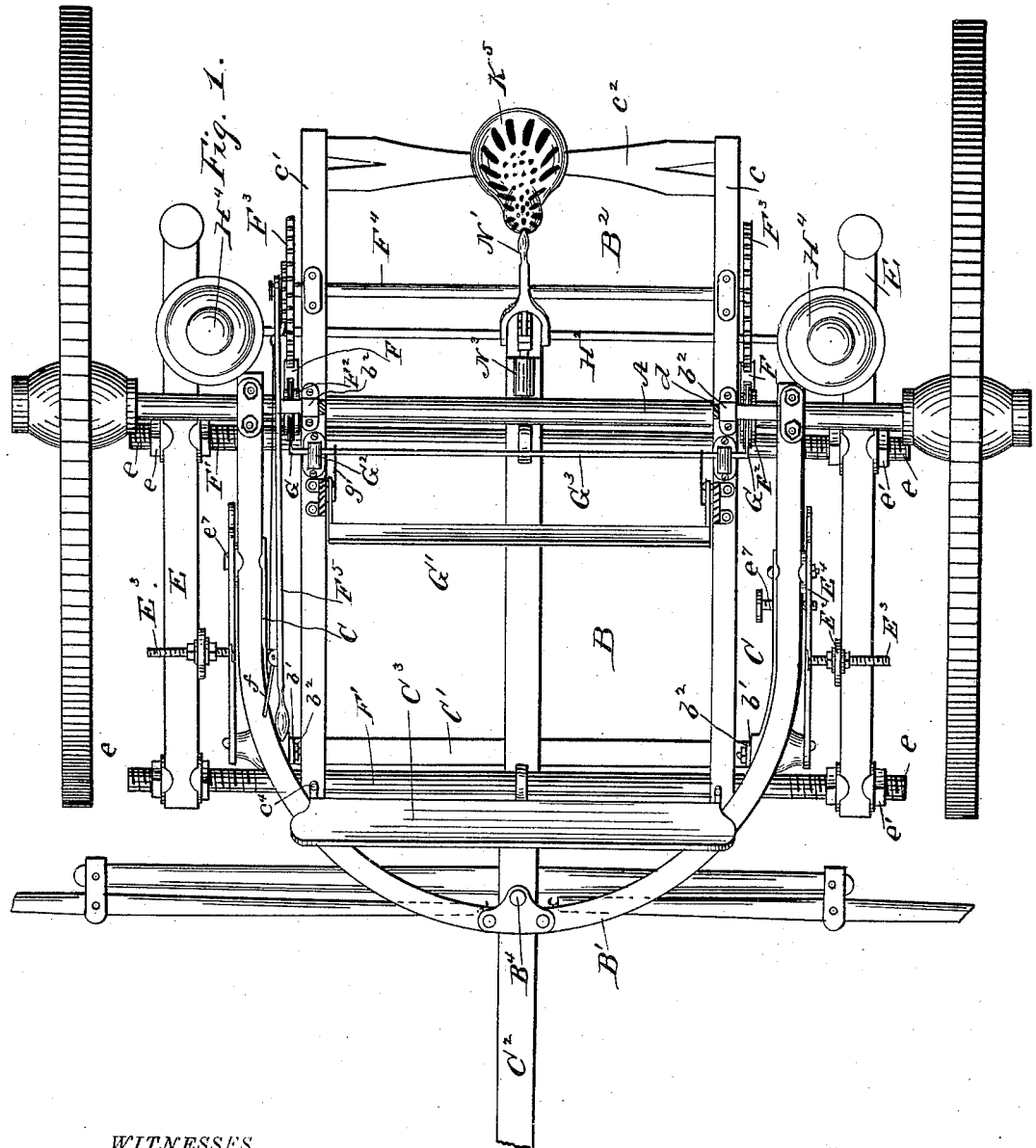
Figure 2:
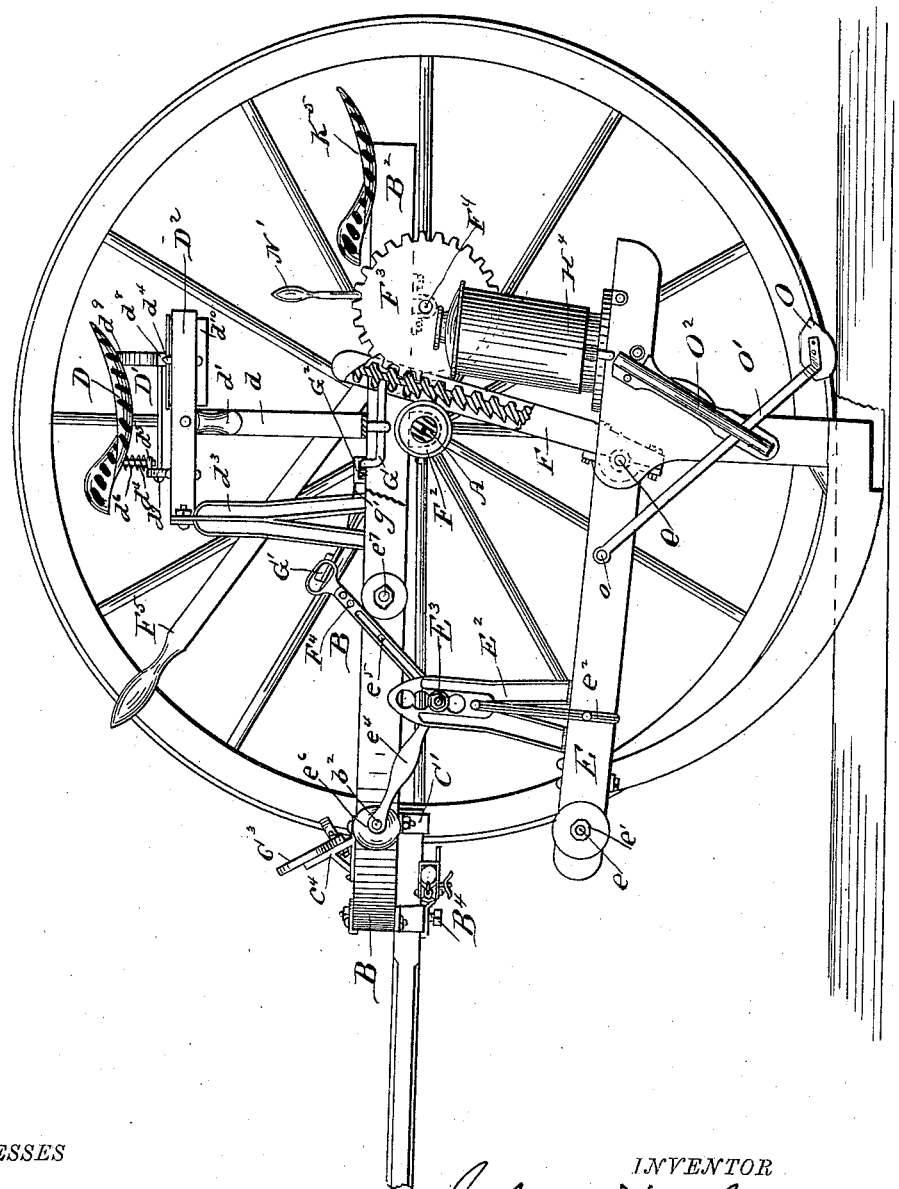

In the accompanying drawings, forming a part of this specification, Figure 1 is a plan view of the improved planter. Fig. 2 is a side elevation, partly in section, of the machine. Fig. 3 is a similar view showing the heel of the runner raised, and in dotted lines the pivot elevated. Fig. 4 is a rear view. Fig. 5 is a transverse section through the feeder. Figs. 6 and 7 are top and bottom views, respectively, of the cup-plate and cut-off. Fig. 8 is a plan view of the supporting-plate for the feeder. Fig. 9 is a bottom view of the gear and lower or sight feed plate. Fig. 10 is a bottom view of the casing above the lower feed-plate. Figs. 11, 12, and 13 are details of the feeding mechanism. Fig. 14 is a longitudinal section through the heel-post, showing the cut-off. Fig. 15 is a rear or face view, and Fig. 16 a detail, of the cut-off. Fig. 17 illustrates the ratchet mechanism. Fig. 18 is a detail of the mechanism for locking the racks.

Upon the through-axle A is mounted the main frame B, composed of two sections, B' B², fitted together, the one within the other, as shown in the drawings. The front section, B', is constructed in one piece, of U form, the two ends resting upon and attached by bolts or clips to the axle, while the rear section, B², composed of the two side bars, $c\ c'$, and end bars, $c^2$, is likewise independently supported upon and fastened to the axle, the ends of the side bars being mortised into or otherwise secured to the front section within the forward end thereof.
As thus constructed, a light and strong frame is secured well supported upon the axle, the two sets of side bars affording ample facilities for attaching the various devices without materially diminishing its rigidity and strength. For the purpose of still further bracing the frame and affording a support for the end of the tongue, a brace-rod, C, is fastened at $b'$ by bolts $b^2$, passing through the side bars, and braces $C'$, extending back along the inner curves of the forward section, B'. The tongue $C^2$ passes through a stirrup attached to the under side of the central section, B', where it is secured by a bolt, $B^4$, while the end of the tongue is received in a socket or stirrup attached to the under side of the brace-rod C, where it may be secured by a bolt, if desired.

The foot-board $C^3$ is mounted upon brackets $c^4$, fastened to the side bars, $c'$.

The driver's seat D is mounted upon springs and secured to a frame, D', capable of being moved forward and backward on a stationary frame, $D^2$. The frame $D^2$ is mounted at or near its center upon brackets $d'\ d'$, fastened to a curved brace, $d$, extending from one side of the main frame to the other, where it is secured by clips $d^2\ d^2$ on the side bars. The front portion of the frame $D^2$ is fastened to supports $d^3\ d^3$, rising from the inner side bars, $c'\ c'$. The movable frame D' is composed of two curved bars, $d^4\ d^4$, fastened together by braces or rods, and fitted to slide on the side bars of the frame $D^2$. The front bar $d^4$ is provided with a lug or offset, $d^5$, to receive a bolt, $d^6$, projecting from the under side of the seat D, the bolt serving not only to steady and support the seat, but also to retain in its place the coiled spring $d^7$, upon which the front of the seat is mounted. The rear bar $d^4$ is provided with horizontal plates or bearings $d^8$, to receive the ends of a curved or leaf spring, $d^9$, attached to the seat near its center. The bars $d^4$ $d^4$ are made curved for the double purpose of securing strength and accommodating a tool-box, $d^{10}$, within the frame $D^2$.

The devices thus far described constitute the sulky proper, and, although especially adapted and arranged to accommodate the planting mechanism about to be described, it could be employed to great advantage as a foundation upon which to build or attach other mechanisms. The frame is light and rigid, affords ample facilities for attaching supplemental devices, and the sliding seat enables the person driving to transfer his weight to either side of the axle for balancing the mechanism.

The runner-frame is composed of the two beams, E E, connected together by the through rods or bars $F'$ $F'$. These bars $F'$ $F'$ are screw-threaded or provided with threaded extensions $e$ $e$, which pass through the beams E E, and are held in position by the clamping-nuts $e'$ $e'$, thus permitting the distance between the runners to be varied or adjusted at will. Near the front end of each beam E, and on the inner side thereof, is secured a bracket, $E^2$, for attachment to the main frame. To insure the requisite degree of stability and firmness, the lower end of this bracket $E^2$, at the point of attachment to the beam, is bifurcated, and a brace, $e^2$, applied on the outer side of the beam, extends above the point of division, and is securely fastened by a bolt or otherwise to the brace. The upper portion of the bracket $E^2$ is slotted and provided with a series of enlarged openings for the reception of a thimble, through which the bolt $E^3$ is passed. These bolts $E^3$ $E^3$ form the pivots or fulcrum upon which the beams and runners oscillate. They are secured to or may form the joint-pin of toggle-levers $E^4$ $E^4$, through which the beams E E are attached to the main frame. Each of the toggle-levers $E^4$ is composed of the two links $e^4$ $e^5$, and when in operation these links are bent downward, as shown in Fig. 3. The forward end of the link $e^4$ is fastened to the casting or bracket $e^6$ and to the main frame by the bolt $b^2$, passing through the link $e^4$, casting $e^6$, frame B, inner brace, $C'$, and the end of the brace C. The links $e^5$ $e^5$ are fastened to the frame by bolts $e^7$, passing through the braces $C'$ and frame B into the links. The bolts $e^7$ are provided with hand-wheels, levers, or angular heads, in which latter case a wrench is necessary to turn them. As thus constructed, ample provision is made for the raising, lateral and vertical adjustment, and the removal of its runners and their connected mechanism.

By the simple withdrawal of the bolts $e^7$ the forward end of the beams and runners can be raised from the ground, and held in that position by again fastening the links $e^5$ to the frame by returning the bolt, the toggle being then bent upward, as shown in Fig. 3. In this position the machine is ready for transportation without taking it apart or changing any of its adjustments. By shifting the position of the links $e^5$ on the bolts $e^7$ (a series of holes being provided in the links for that purpose) the pivots of the runners can be advanced or retreated.

The vertical adjustment of the runners is accomplished by changing the position of the thimble in the bracket $E^2$ without changing the position of the links $e^4$ $e^5$, while the lateral adjustment of the runners on the bars $E'$ $E'$ is provided for by the long bolts $E^3$ $E^3$, passing through the thimbles and the securing-nuts thereon.

To remove the planting attachment from the sulky-frame it is only necessary to withdraw the bolts $e^7$ and $b^2$.

The adjustment and manipulation of the rear end of the runners are accomplished in the following manner: On the rear brace, $E'$, are hung two rack-bars, F F, one at each side of the frame. These rack-bars are made H shape in cross-section, toothed on two sides between the flanges, the teeth on the front side being square above and inclined or ratchet-shaped below the center line.

Mounted upon the axle A are two anti-friction rollers, $F^2$ $F^2$, provided with a central rib or flange and lateral bearing-surfaces. The rib does not touch or interfere with the teeth of the rack, while the surface of the roller on either side bears against the flanges and holds the rack in engagement with the operating-gears $F^3$ $F^3$, which are adjustably secured to a shaft, $F^4$, journaled in the side bars, $c'$ $c'$.

The hand-lever $F^5$ is the medium whereby the shaft $F^4$ is rotated and the runners raised or lowered. It is loosely mounted upon the end of the shaft $F^4$, and carries a sliding bolt or dog, which engages with the teeth of a gear fastened to the side of one of the gears $F^3$, or directly to the shaft $F^4$. This bolt is pressed forward into engagement with the teeth of the gear by a spring, and is retracted by a lever, $f$, pivoted near the end of the hand-lever $F^5$, and connected to the sliding bolt by a rod or other suitable means.

It will be observed that while the operating mechanism is disposed and mounted back of the axle the hand-lever is so situated as to be within easy reach of the driver, who can at any moment raise or lower the runners with a positive movement. When adjusted for operation, the runners are secured and held in position by two bolts, G G, sliding in ways on the side bars, and engaging the teeth on the front of the racks. The teeth on the upper portion of the racks are made square, so that the bolts will prevent any movement of the runners up or down until the bolts are withdrawn; but after the runners have cleared the ground there is no necessity for preventing their farther upward movement; hence the teeth of the rack are beveled to cause the bolts to slip over them. The bolts are pressed forward into engagement with the racks by springs, and they are withdrawn by means of a foot-lever, G', mounted upon brackets $G^2 G^2$, pivoted to the side bars, and provided with hooks $g' g'$, which, when the foot-lever is pressed forward and downward, engage the cross-bar $G^3$ connecting the bolts, and draw them forward. The foot-lever is so pivoted as to be swung out of engagement with the bolts when not in use.

As will be apparent to those skilled in the art, this planter is admirably well adapted to receive and operate in connection with various forms of feeding devices, either rotating or reciprocating, but especially so with the feeder now about to be described, containing a number of novel and valuable features.

The grain-feeders are of the rotary type, and are mounted upon the rear portion of the beams E E. Each feeder consists, generally, of a hopper, a feeding-plate, a conduit, and a second carrier or sight-feed, whereby the feeding operation may be at all times observed. These are all mounted upon a plate or bracket, H, securely fastened to the top of the beam. On the inner face of the beam, and directly beneath an opening, $h$, in the plate H, is fastened a bracket or plate, H', forming bearings for the reception of the end of the horizontal shaft $H^2$ and vertical spindle $H^3$.

Mounted upon and secured to the plate H is a casing, $H^4$, within which the operating parts of the feeder are arranged. It contains two divisions, $h'$ and $h^2$, situated the one above the other, and connected by a conduit, $h^3$, and supporting-walls $h^4$. The larger section, $h^2$, is united to the cylindrical support $h^4$ by a number of radial bars, leaving open spaces, into which are fitted glass covers, properly secured in place by clips $h^5$ or other suitable means. The plate $h^6$ is made separate from and is secured on top of the support $h^5$, and constitutes the bottom of the upper section. A single opening, $h^7$, is made in this plate near the periphery, which registers and communicates with the conduit $h^3$ and the pockets in the feeder-plate. Portions of the plate may be cut away between the center and the path traversed by the pockets in the feed-plate to reduce the weight. The ring $h^8$, forming the walls of the upper section, and removably secured to the plate $h^6$ by screws, (a hinge and locking device may be employed, if desired,) supports the hopper and the cap-plate $h^9$, carrying the cut-off $h^{10}$. The cap-plate $h^9$ is made with a rounded or conical upper surface to prevent the grain from lodging on top, and it is connected to the ring $h^8$ by an arched support, $h^{11}$, on one side and a flat plate, $h^{12}$, on the opposite side, the last-named plate being provided with suitable bearings for the pivoted cut-off $h^{10}$ and its retaining-cap $h^{13}$.

Two feeding-plates are employed—one, I, in the upper and another, I', in the lower sections. The plate I is provided with a central opening adapted to fit the squared end of the spindle $H^3$, by which it is rotated. It is also provided with a series of openings or pockets, $i$, disposed equidistant from each other near the edge of the plate. These pockets pass in succession under the cut-off, and deposit their contents into the conduit, from where it passes into similar pockets in the plate I'. This last-named plate rotates in unison with the upper plate, being connected to the gear $H^5$ on the spindle $H^3$ by a pin, $h^{14}$, projecting into a hole in the pinion. The divisions between the pockets in this plate are made inclined to facilitate the passage of grain into the pockets and prevent its lodging on the face of the plate, and thus clogging the plate. The grain, after being received into the pockets in the plate I,' is carried around under the glasses until in reaches the discharge-opening, making nearly a complete revolution within plain sight of the operator, who is thus enabled to ascertain whether or not the machine is working properly, and if the corn or other seed should from any cause fail to be discharged from the pockets as they pass the opening in the plate H, that fact can as well be observed. The plates I and I' are removable, and other plates containing a different number of pockets can at any time be substituted therefor. The grain, as it is delivered from the lower plate or sight-feed, I', passes down into the hollow heel-post J of the runner, and from thence to the ground.

Within the post J is located a pivoted gate or cut-off, J', which catches each charge and holds it against a glass, $J^3$, in view of the operator located on the seat $K^5$, attached at the rear of the main frame. The upper portion of the gate J' is straight, and extends rearwardly across the opening in the post, and as it is thrown from one side to the other on the pivot $j$ it deflects the charge to the right and left alternately, while the lower portion, extending laterally across the post, is curved forward and provided with converging sides. At the lower end of the hollow post, and in front of the curved portion of the gate, is located a partition, $J^2$. This partition-plate is made separate from the post, and is supported upon two cross-bars, $j^2 j^2$—one at either end—resting upon lugs $j^5 j^5$, cast upon or secured to the side pieces, $j^4 j^4$, of the post. The lower edges of the side pieces are united by an angular strip, $j^6$, cast half upon each side piece, or attached thereto by suitable fastenings. The angular strip $j^6$ is adapted to receive and hold the lower end of a glass plate, $j^3$, which, resting upon the cross-bars $j^2 j^2$, serves to hold the partition-plate firmly in position. The upper edge of the glass is held by the overlapping flange on the cover $j^7$, which latter is fastened to the side pieces, $j^4 j^4$, by wood-screws, so as to be easily removed. Instead of fastening the glass by the flange on the cover, necessitating the removal of the latter when it is desired to reach or remove the working parts, it may be secured by buttons or like contrivances fastened to the cover and lapping over the edge of the glass. Inclined ledges or projections $l$ $l$ are cast or otherwise secured to the side pieces, $j^4$, and the partition $J^2$, under which the edges of the inclined lower portion of the gate pass. The seed, as they fall from the sight-feed, are directed by the upper portion of the gate down into the pocket formed by the rearwardly-curved lower portion of the gate, the side of the post, the division-plate, and the glass front, thus bringing it against the glass and into plain view. When the gate vibrates to one side preparatory to the delivery of a fresh supply from the sight-feed, the grain in the opposite side is deposited in the furrow, and the new charge is held as before. These movements of the gate are all visible to the operator, who is enabled not only to see the working of the feed, but to observe when the box is choked, as is sometimes unavoidable in soft ground.

The gate is operated from the rotating plate $I'$ through the pivoted lever K, engaging a pin, $k$, on the gate, a bent lever, $K'$, passing through the beam and engaging the upper end of a lever, K, and a pivoted cam-plate, $K^2$, with which pins $k^2$ on the plate $I'$ engage. These pins $k^2$ are arranged in two series, placed opposite the spaces between the pockets, the pins of one series alternating with those of the other series. The cam-plate $K^2$, pivoted beneath the plate H, is provided with two segmental flanges projecting through slots in the plate H into the path of the pins $k^2$. As the plate $I'$ revolves, one of the pins, striking the flange, throws the plate to the opposite side, where it is held until that pin passes off, when the next pin, being on the opposite side, strikes the flange, and thus the cam-plate is thrown from one side to the other. This operation is repeated just before each pocket discharges into the post J. It will be readily understood how each vibration of the cam-plate causes a like vibration of the gate $J'$.

The gate and sight-feed within the runner-post may be employed in connection with other forms of feeding mechanism with or without the sight-feed; but better control is obtained by using both sight-feeds.

If desired, the pins on the plate $I'$ may be so disposed and arranged relatively to the cam-plate and gate that two or more of the pockets may discharge into the leg before its contents are deposited in the ground.

The spindles $H^3$ and shaft $H^2$ are connected by gears M $H^5$, and the shaft $H^2$ is rotated at proper intervals by an automatic check-row attachment, or by the hand of an operator located on the rear seat.

In another application filed simultaneously herewith I have described an automatic check-row attachment designed and adapted to operate in connection with the planter herein described; but in the present instance the shaft $H^2$ is provided with a ratchet-wheel, N, and the lever $N'$, embracing the ratchet-wheel and pivoted upon the shaft. This lever carries a pivoted dog, $N^2$, having an extension, $n$, which, by coming in contact with a set-screw, $n'$, limits the forward movement of the lever. A spring-pressed dog, $N^3$, prevents the back movement of the ratchet. The lever $N'$ is under the control of an operator located on the rear seat. After the grain has been deposited in the furrows made by the runners, it is covered by a blade, O, attached to the end of a brace, $O'$, pivoted to the beam at $o$, which presses the earth over and into the furrow. The brace $O'$ is guided in a box, $O^2$, containing a spring which serves to hold the covering-blade with a yielding pressure upon the ground.

It will be observed that all the working parts of the machine are compactly arranged within the space bounded on either side by the wheels. Thus the parts are sustained and protected by the wheels, which are so high as to permit transportation of the machine without disorganization or liability of interference. The runners are applied at or beneath the axle. The frame is well balanced. The driver can apply his weight on either side of the axle by sliding his seat forward or backward. The lever for pressing or raising the runners is within easy reach of the driver and conveniently located. The runners can be elevated for transportation without interfering with any of the adjustments. The runners can be adjusted laterally. The feeding can at all times be observed and noted and any irregularity or failure to operate corrected. All these and numerous other important and essential advantages are secured by the construction and arrangement of parts described.

Having now described my invention, I claim as my invention—

1. In a sulky-planter, and in combination with the runner-frame pivoted in front and extending beneath the axle, the driver's seat located above and adapted to slide forward or back of the axle, substantially as described.

2. In a planter such as described, and in combination with the main frame thereof, the toggle-lever and the running frame pivoted to the center pin of the toggle, substantially as described.

3. In a planter, and in combination with the toggle-levers secured thereto, the adjustable runner-frame mounted upon the extended toggle-pin, substantially as described.

4. In a planter, and in combination with the main frame thereof, the adjustable toggles and the laterally-adjustable runners pivoted upon the extended toggle-pins, substantially as described.

5. In a sulky-planter, and in combination with the main frame thereof, the removable and adjustable runner-frame supported upon the adjustable toggle-pins at a point within the radius of the wheels, substantially as described.

6. In a sulky-planter, and in combination with the main frame, the runners supported upon pivots near the front of the machine and extending beneath and to the rear of the axle, and the sliding seat located in a frame situated above and extended in front and rear of the axle, substantially as described.

7. In a sulky-planter, the combination of the main frame secured to the axle, the runner-frame pivoted to the main frame in front of and extending beneath the axle, the pivoted rack-bars attached to the rear of the runner-frame, and the operating-pinions mounted on the main frame and in rear of the driver's seat, substantially as described.

8. In combination with the main frame and the runner-frame, the toggle, to the center pins of which the runner-frames are pivoted, said toggle-levers being adjustably secured to the main frame, substantially as described.

9. The combination, in a sulky-planter, of the front and rear sections constituting the main frame, the side bars of said rear section being located within the front section, and united thereto, as shown, to strengthen the frame and provide bearings for the operating mechanism, as set forth.

10. In combination with the main frame, the runner-frame and the toggle-levers, to which the runner-frame is pivoted, the bolts passing through the side bars, brace, and forward link of the toggle, substantially as and for the purpose specified.

11. The combination, in a sulky-planter, of the main frame, constructed in two sections and mounted upon the axle, as described, the brace extending across the front of the frame, and means, such as described, for connecting the tongue to the front section and brace, as and for the purpose set forth.

12. In combination with the main frame and the toggle-links fastened thereto, and provided with the extended pivot-bolts, the laterally-adjustable runner-frame sustained upon said pivot-bolts, substantially as described.

13. In combination with the main frame and pivoted supports for the runner-frame, the slotted brackets attached to the runner-beams and provided with adjustable thimbles for the reception of the pivot-bolts, substantially as described.

14. As a means for supporting and adjusting the runner-frame, and in combination therewith, the toggle-links attached at their opposite ends to the main frame, their contiguous ends being connected by the bolt upon which the runner-frame is pivoted, substantially as described.

15. In combination with the toggle-links, pivoted to the main frame and supporting the pivot for the runner-frame, the hand-lever, attached to one of said links and serving as a means for raising and lowering the runner-frames, substantially as described.

16. In a planter, and in combination with the main frame thereof, the runner-frame pivoted upon the center pin of a toggle, both members of said toggle being fastened to the main frame, substantially as described.

17. In a planter, and in combination with the main frame thereof, the runner-frame pivoted upon the center pin of a toggle, one member of said toggle being supported upon a fixed pivot and the other member adjustably secured to the main frame, substantially as described.

18. In combination with the slotted brackets secured to the runner-beams, the adjustable toggles secured to the main frame and the elongated toggle-pin, substantially as described.

19. In combination with the main frame of the sulky, and the runner-frame mounted upon pivots, the links supporting said pivots, secured to the main frame and adapted to be swung above or below the points of attachment to the main frame, substantially as described.

20. In combination with the hopper and primary feed-plate connected thereto, the conduit and the supplemental feeding-plate, of larger diameter, located immediately below the primary feed-plate, and provided with transparent covers on its extended upper portion, substantially as described.

21. The removable division-plate having the two cross-bars, the side plate of the heel-post having the lower angular cross-bar and lugs or seats for the cross-bars on the division-plate, and the glass cover, substantially as described.

22. The cam-plate provided with segmental flanges, in combination with the rotating plate I', having the two series of pins, substantially as described.

23. In combination with the shaft for operating the feeding mechanism, the ratchet-wheel, pivoted lever, pawl provided with the extension, and the set-screw bearing against the end of the pawl, substantially as described.

24. In combination with the ratchet-wheel, the pawl vibrating upon an axis coincident with that of the ratchet-wheel, said pawl being provided with an extension, such as described, co-operating with the fixed set-screw for limiting the throw of the pawl, substantially as described.

25. In combination with the pivoted runners, the rack-bars provided with the two sets of teeth, such as described, the one for engagement with operating-gear and the other for engagement with the locking bolt or detent, as set forth.

26. In combination with the pivoted runner-frame and mechanism for positively raising and depressing the rear portion thereof, the detent and rack-bar, the latter provided with square and inclined teeth, as and for the purpose set forth.

27. The covering-blade O, attached to the brace O', pivoted to the runner, in combination with the box O² and its contained spring, substantially as described.

28. In combination with the main frame, and as a means for supporting and adjusting the runner-frame, the toggle-levers $E^4$, composed of the links $e^4$ $e^5$, attached to the main frame by bolts $b^2$ $e^7$, and carrying the pivots $E^3$ for the runner-frame, substantially as described.

29. In combination with the main frame and runner-frame, united by the toggle-levers $E^4$, as described, the rack-bars F, pivoted upon the rod F', the anti-friction roller $F^2$, operating-gear $F^3$, and detent G, as and for the purpose set forth.

30. As a means for attaching and detaching the runner-frame and sulky-frame, and in combination therewith, the toggles $E^4$, bolts $e^7$, and bolts $b^2$, passing through the brace C', side bars, and links $e^4$, substantially as described.

31. In combination with the runners, beams E E, the through-rods E' E', and brackets $E^2$, for attachment to the sulky-frame, substantially as described.

32. The combination, to form a sulky-frame, of the U-shaped front section, B', with its ends fastened to the axle, the rear section, $B^2$, of less width, secured to the front section within the bend and attached to the axle, all substantially as shown and described.

33. The frame $D^2$, located above the axle, in combination with the movable frame D', springs $d^7$ $d^9$, and seat D, substantially as described.

34. In combination with the holding and adjusting racks F and bolts G, the foot-lever G' and hooks $g'$, substantially as described.

35. In combination with the upper feed-plate and conduit $h^3$, the lower feed-plate, having its pockets arranged in a line outside of the upper feed-plate, both of said feed-plates being located in parallel planes, substantially as described.

36. In combination with the two feed-plates, of different diameters, the conduit and the transparent cover for the larger feed-plate, substantially as described.

37. In combination with the spindle $H^3$, the upper and lower feed-plates, I I', the conduit $h^3$, and cover $H^{13}$, extending beyond the casing surrounding the upper feed-plate, substantially as described.

38. In combination with the post J, the pivoted gate J', having the straight upper and curved lower portions, the glass $J^3$, and the partition $J^2$, substantially as described.

39. In combination with the oscillating gate J', having the curved lower end, the partition $J^2$, and the inclined ledges $l$ $l$, substantially as described.

JOHN DIX MILLS.

Witnesses:
  FRED. F. CHURCH,
  A. S. STEWART.